United States Patent
Zanzig et al.

(10) Patent No.: US 7,163,975 B2
(45) Date of Patent: *Jan. 16, 2007

(54) TIRE WITH COMPOUND OF RUBBER COMPOSITION COMPRISED OF SILANOL AND/OR SILOXY FUNCTIONALIZED ELASTOMER AND SILICA

(75) Inventors: David John Zanzig, Bertrange (LU); Georges Marcel Victor Thielen, Schouweiler (LU); John Joseph Andre Verthe, Kent, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 388 days.

This patent is subject to a terminal disclaimer.

(21) Appl. No.: 10/628,735

(22) Filed: Jul. 28, 2003

(65) Prior Publication Data

US 2004/0054032 A1    Mar. 18, 2004

Related U.S. Application Data

(60) Provisional application No. 60/411,312, filed on Sep. 17, 2002.

(51) Int. Cl.
*C08L 25/10* (2006.01)
*C08F 136/05* (2006.01)
*B60C 5/00* (2006.01)

(52) U.S. Cl. .......... 524/47; 524/493; 524/495; 524/858; 524/862; 524/865; 525/105; 528/25

(58) Field of Classification Search ........... 524/47, 524/493, 495, 858, 862, 865; 525/105; 528/25
See application file for complete search history.

(56) References Cited

U.S. PATENT DOCUMENTS

| | | | |
|---|---|---|---|
| 6,013,718 A | 1/2000 | Cabioch et al. | 524/506 |
| 6,071,995 A | 6/2000 | Labauze | 524/269 |
| 6,075,084 A * | 6/2000 | Mabry et al. | 524/495 |
| 6,998,448 B1 * | 2/2006 | Zanzig et al. | 525/333.2 |

* cited by examiner

*Primary Examiner*—Kriellion Sanders
(74) *Attorney, Agent, or Firm*—Henery C. Young, Jr.

(57) ABSTRACT

The invention relates to a tire having at least one component (e.g. tread) of a rubber composition comprised of a composite of styrene/butadiene elastomer and functionalized styrene/butadiene elastomer containing an internal silanol and/or siloxy group therein with pendent silanol and/or alkoxy groups of a polymodal (e.g. bimodal) molecular weight distribution and a dispersion therein of silica aggregates of which a portion thereof contain a plurality of hydroxyl groups on their surface in a form of geminal hydroxyl groups. In one aspect, said silica aggregates may be pre-treated to reduce said hydroxyl groups on their surface prior to blending with said silanol and/or siloxy functionalized elastomer.

17 Claims, No Drawings

TIRE WITH COMPOUND OF RUBBER COMPOSITION COMPRISED OF SILANOL AND/OR SILOXY FUNCTIONALIZED ELASTOMER AND SILICA

The Applicants hereby incorporate by reference prior U.S. Provisional Application Ser. No. 60/411,312, filed on Sep. 17, 2002.

FIELD OF INVENTION

The invention relates to a tire having at least one component (e.g. tread) of a rubber composition comprised of a composite of styrene/butadiene elastomer and functionalized styrene/butadiene elastomer containing an internal silanol and/or siloxy group therein with pendent silanol and/or alkoxy groups of a polymodal (e.g. bimodal) molecular weight distribution and a dispersion therein of silica aggregates of which a portion thereof contain a plurality of hydroxyl groups on their surface in a form of geminal hydroxyl groups. In one aspect, said silica aggregates may be pre-treated to reduce said hydroxyl groups on their surface prior to blending with said silanol and/or siloxy functionalized elastomer.

BACKGROUND OF THE INVENTION

Tires are historically prepared with treads of a rubber composition which is comprised of various elastomers and particularly cis, 1,4-polybutadiene and styrene/butadiene copolymer elastomers, although minor amounts of other elastomers, including, for example, cis 1,4-polyisoprene, isoprene/butadiene and 3,4-polyisoprene may although be present.

Tire tread rubber compositions conventionally contain particulate reinforcing fillers which are normally carbon black and/or aggregates of precipitated silica. Such reinforcement fillers are will known to those having skill in such art.

When precipitated silica is used as a reinforcing filler, its reinforcing effect for the elastomer(s) is usually enhanced with the aid of a coupling agent which contains a moiety which is reactive with hydroxyl groups (e.g. silanol groups) contained on the surface of the precipitated silica and another moiety which is interactive with the elastomer(s), particularly with diene-based elastomers. Such use of coupling agents for precipitated silica aggregates is well known to those having skill in such art.

Sometimes, functionalized elastomers are taught for use with precipitated silicas. For example, in U.S. Pat. No. 6,013,718, it has been proposed to provide a rubber composition including a functionalized diene polymer and silica in which the functionalized diene polymer bears a chain end as a silanol functional group or a polysiloxane block which has a silanol end. As a further example, in U.S. Pat. No. 6,071,995 such a proposal is made where a carbon black having silica fixed to its surface is suggested for use with a similar functionalized diene polymer.

In the description of the invention, the term "phr" relates to parts by weight of a particular ingredient per 100 parts by weight of rubber contained in a rubber composition.

The terms "rubber" and "elastomer" are used interchangeably unless otherwise indicated, and the terms "cure" and "vulcanize" may be used interchangeably unless otherwise indicated.

SUMMARY OF THE INVENTION

In accordance with this invention, a tire is provided having at least one component of a rubber composition comprised of, based upon 100 parts by weight of elastomer (phr), (A) 100 phr of elastomers comprised of:
(1) about 30 to about 80 phr of a styrene/butadiene elastomer composite (SBR composite) comprised of a styrene/butadiene copolymer elastomer (SBR-1) and a functional styrene/butadiene copolymer elastomer (SBR-2) which contains at least silicon atom within said elastomer with associated pendent hydroxyl and/or alkoxy groups from said silicon atom, as a part of the (SBR-2) elastomer chain to thereby divide said elastomer into at least two segments thereof (SBR-2A and SBR-2B) with the silicon atom of said silanol and/or siloxy group therebetween, wherein said SBR composite is thereby comprised of a polymodal (e.g. primarily bimodal) molecular weight configuration comprised about 35 to about 55 weight percent thereof of said (SBR-1) having a number average molecular weight (Mn) in a range of about 200,000 to about 300,000 and, correspondingly, about 65 to about 35 weight percent thereof of said (SBR-2) having a number average molecular weight (Mn) in a range of about 400,000 to 550,000; wherein said elastomer contains from zero to a maximum of ten weight percent of at least one additional styrene/butadiene copolymer elastomer (SBR-3) pendent to said silicon atom and having an number average molecular weight (Mn) of greater than 550,000, alternatively between 550,000 and about 650,000; and having a styrene contend and Tg value in said range for said SBR-1 and SBR-2;
(2) about 20 to about 70 phr of at least one additional diene-based elastomer; and
(B) about 35 to about 100, alternately about 50 to about 100, phr of particulate reinforcement comprised of:
(1) about 35 to about 85, alternately about 45 to about 85, phr of aggregates of precipitated silica comprised of a plurality of individual elementary silica particles, wherein said silica particles contain hydroxyl groups thereon (e.g. silanol groups) and wherein a portion of said silica particles contain geminal hydroxyl in a ratio of geminal hydroxyl groups to hydroxyl groups of at least 0.2/1 and preferably about 0.2/1 to about 0.4/1, wherein said silica aggregates also preferably have:
  (a) a CTAB value according to ASTM D3765 test in a range of from about 80 to about 100, alternately about 80 to about 89, $m^2/g$, and
  (b) a BET according to ISO 57/94/1, Annex D test in a range of about 155 to about 170 $m^2/g$, and
(2) from zero to about 15, alternately about 5 to about 15, phr of carbon black,
(C) a coupling agent having:
(1) a moiety reactive with
  (a) said hydroxyl groups contained on the surface of said silica and silica treated carbon black; and
  (b) said silanol and/or siloxy groups of said (SBR-2) elastomer, and;
(2) another moiety interactive with said additional diene-based elastomer and said (SBR-1) and (SBR-2) of said (SBR) composite, and:
(D) optionally, about 1 to about 10 phr of a starch/plasticizer composite comprised of starch and plasticizer therefor of a weight ratio in a range of about 0.5/1 to about 5/1, wherein said starch/plasticizer has a softening point in a range of about 110° C. to about 170° C., and;

(E) optionally said coupling agent as a combination of a bis-(3-triethoxysilylpropyl) polysulfide having an average of from 2 to 2.5 connecting sulfur atoms in its polysulfidic bridge and a bis-(3-triethoxysilylpropyl) polysulfide having an average of from 3 to 4 connecting sulfur atoms in its polysulfidic bridge, wherein said polysulfide having an average of from 2 to 2.5 connecting sulfur atoms in its polysulfidic bridge (to the exclusion of such polysulfide having an average of from 3 to 4 connecting sulfur atoms in its polysulfidic bridge) is blended with said rubber composition in the absence of sulfur and sulfur vulcanization accelerator and wherein said polysulfide having an average of from 3 to 4 connecting sulfur atoms in its polysulfidic bridge is thereafter blended with said rubber composition in the presence of sulfur and at least one sulfur vulcanization accelerator.

In practice, the elastomers of said SBR composite, (SBR-1) and (SBR-2), may have a weight average molecular weight to number average molecular weight ratio (Mw/Mn) of not more than 2 and preferably in a range of about 1.01 to about 1.15, In one aspect of the invention, said (SBR-2) functionalized styrene/butadiene elastomer may of the general Formula (I):

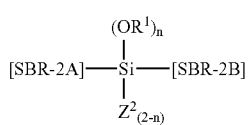

(I)

wherein said [SBR-2A] and [SBR-2B] are individual elastomer segments each having a bound styrene content in a range of from about 25 to about 35 percent, a vinyl 1,2-content in a range of about 50 to about 70 percent based on the butadiene component of the respective styrene/butadiene (SBR-2) copolymer, a Tg in a range of about −15° C. to about −30° C; wherein the silicon (Si) atom is attached to a butadiene moiety of the respective (SBR-2A) and (SBR-2B); $R^1$ is selected from selected from hydrogen, methyl, ethyl, propyl, butyl and phenyl groups, preferably from hydrogen (thereby forming a pendent silanol group) or as a methyl or ethyl group (and therefore forming a pendent alkoxy group); and $Z^2$ is selected from an additional SBR segment of said styrene content and said Tg, an alkyl radical containing from 1 to about 18 carbon atoms, or an aromatic radical containing from 6 to about 12 carbon atoms, preferably from said alkyl radials and said aromatic radicals thereby yielding a substantially linear silicon coupled elastomer; and where n is a value in a range of from zero to 2, alternately from 1 to 2, preferably about 2.

Accordingly, in one aspect of the invention, it is considered herein that said Formula (I) may be represented as a substantially linear silicon coupled elastomer (SBR-2) as Formula (IA) or (IB):

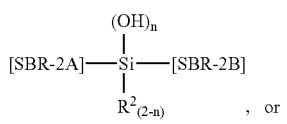

(IA)

, or

-continued

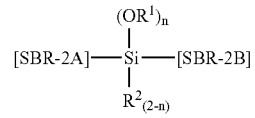

(IB)

wherein $R^1$ is selected from methyl, ethyl, propyl, butyl, and phenyl radicals, preferably an ethyl radical, and n is a value in a range of from zero to 2.

Representative examples of $R^2$ radicals are radicals selected from, for example, isopropyl, t-butyl, phenyl and tolyl radicals.

In practice, it is considered that said (SBR-2A) and SBR-2B) are substantially equal in their individual physical characteristics.

In practice, said silica aggregates of which a portion contain geminal hydroxyl groups on their surfaces, such silica aggregates are considered herein to have an average total of at least 15, preferably an average total in a range of from about 15 to about 20, hydroxyl groups per square nanometer of surface area of said silica particles.

A significant aspect of this invention is the inclusion of the precipitated silica which contains a significant geminal hydroxyl content. An additional significant aspect of this invention, for a rubber tire tread, is the combination of the precipitated silica and the composite (SBR) which contains the functionalized styrene/butadiene elastomer (SBR-2) and the bimodal weight distribution characteristic of the (SBR-1) and SBR-2) BR-1) and said (SBR-2), with said silicon atom of said functionalized (SBR-2)having a pendent hydroxyl or alkoxy group thereon, A further significant aspect of the invention is the optional inclusion of said starch/plasticizer composite and/or said combination of said bis-(3-ethoxysilylpropyl) polysulfide coupling agents.

A representative example of said (SBR) composite of styrene/butadiene copolymer rubber (SBR-1) and silicon coupled, silanol and/or siloxane containing, styrene/butadiene elastomer (SBR-2) is considered herein to be T596™ from the Japan Synthetic Rubber Company (JSR).

In one aspect of the invention, it may be desirable for said rubber composition to be comprised of at least one of said starch/plasticizer composite and said combination of bis-(3-triethoxysilylpropyl) polysulfide coupling agents.

By the term "geminal hydroxyl groups" for said amorphous silica it is meant that two hydroxyl groups are on the same silicon atom. The presence of such geminal hydroxyl groups may be determined, for example, by one having skill in the relevant analytical art.

In one aspect of the invention said coupling agent may be an organosulfur silane of the general formula (II):

$(R^4O)_3—Si—R^5—S_x—R^5—Si—(R^4O)_3$ (II)

wherein $R^4$ is an alkyl radical selected from at least one of methyl and ethyl radicals, preferably an ethyl radical, $R^5$ is an alkylene radical having from 1 to 18 carbon atoms, preferably from 2 through 4 carbon atoms, and x is a value in a range of 2 to 8, with an average of from 2 to about 2.6 or from about 3.5 to about 4, preferably from 2 to 2.6;

In one aspect of the invention, the precipitated silica may be, prior to blending with said elastomer(s):

(A) pre-treated with an with an alkylsilane of the general Formula (III) prior to blending with said elastomer(s) and said coupling agent;

(B) pre-treated with said coupling agent of formula (II);

(C) pre-treated with an organomercaptosilane of formula (IV), or (D) pre-treated with a combination of said alkylsilane of Formula (III) with
(1) said coupling agent of the general Formula (II) and/or
(2) said organomercaptosilane of Formula (IV), wherein said alkylsilane of the general Formula (III) is represented as:

$$X_n\text{—}Si\text{—}R^6_{4-n} \quad (III)$$

wherein $R^6$ is an alkyl radical having from 1 to 18 carbon atoms, preferably from 1 through 4 carbon atoms; n is a value of from 1 through 3; X is a radical selected from the group consisting of halogens, preferably chlorine, and alkoxy radicals selected from methoxy and ethoxy radicals, and wherein said organomercaptosilane of the general Formula (IV) is represented as:

$$(X)_n(R^7O)_{3-n}\text{—}Si\text{—}R^8\text{—}SH \quad (IV)$$

wherein X is a radical selected from a halogen, namely chlorine or bromine and preferably a chlorine radical, and from alkyl radicals having from one to 16, preferably from one through 4, carbon atoms, preferably selected from methyl, ethyl, n-propyl and n-butyl radicals; wherein $R^7$ is an alkyl radical having from one through 4 carbon atoms preferably selected from methyl and ethyl radicals and more preferably an ethyl radical; wherein $R^8$ is an alkylene radical having from one to 16, preferably from one through 4, carbon atoms, preferably a propylene radical; and n is an average value of from zero through 3, preferably zero.

A significant consideration for said pre-treatment of said silica is to reduce, or eliminate, evolution of alcohol in situ within the rubber composition during the mixing of the silica with said elastomer such as may be caused, for example, by reaction of a coupling agent of Formula (II) contained within the elastomer composition with hydroxy groups (e.g. silanol groups) contained on the surface of the silica.

Therefore it is considered, in accordance with this aspect of this invention, that a tire is thereby comprised of a component (e.g. a tire tread) of a rubber composition exclusive of any appreciable content of in situ formed alcohol.

A significant consideration of use of the said functionalized diene-based elastomer of formula (I) as tire tread rubber composition, particularly where said precipitated silica is pre-treated with said organosulfursilane of formula (II) and/or said with said alkylsilane of formula (III), is a reduction, or eliminating, of evolution of alcohol during the mixing of the precipitated silica with said coupling agent (formula II) with the diene-based elastomer and functionalized elastomer insofar as the coupling agent is concerned which may be a consideration where it is desired that an alcohol is not released when mixing the respective ingredients with the respective elastomers, such as for example where it might be desired that alcohol is not thereby released into the atmosphere in a rubber product manufacturing facility such as, for example, a tire manufacturing plant. Thus the alcohol byproduct may be limited to and contained at a silica manufacturing, or a silica treatment, facility exclusive of the mixing thereof with a rubber composition and thereby exclusive of a rubber product manufacturing facility.

In practice, a significant aspect of use of the precipitated silica with the significant geminal hydroxyl content is seen herein that the higher geminal hydroxyl content makes the silica more reactive with alkoxy groups contained in a bis(3-trialkoxysilylalkyl) polysulfide coupling agent, so that less of such coupling agent is normally needed to from a rubber composition of equivalent or suitable various physical properties.

An important aspect of the preferred CTAB limitation for the precipitated silica is apparently a promotion of a relatively low hysteresis for a representative rubber composition which contains such silica in combination with a coupling agent which is indicative of a promotion of relatively reduced rolling resistance for a tire which has a tread of such rubber composition.

Representative alkylsilanes of formula (III) for use in the practice of this invention are, for example, trichloromethylsilane, dichlorodimethylsilane, chlorotrimethylsilane, trimethoxymethylsilane, dimethoxydimethylsilane, methoxytrimethylsilane, trimethoxypropylsilane, trimethoxyoctylsilane, trimethoxyhexadecylsilane, dimethoxydipropylsilane, triethoxymethylsilane and diethoxydimethylsilane. Preferable organosilanes are dichlorodimethylsilane, chlorotrimethylsilane and hexamethyldisilazane.

Representative of organomercaptosilanes of formula (IV) for use in the practice of this invention are, for example organomercaptosilanes as, for example, mercaptomethyltrimethoxysilane, mercaptoethyltrimethoxysilane, mercaptopropyltrimethoxysilane, mercaptomethyltriethoxysilane, mercaptoethyltripropoxysilane and mercaptopropyltriethoxysilane. Preferable organomercaptosilanes of formula (IV) are mercaptopropyltriethoxysilane and mercaptopropyltrimethoxysilane.

Representative of organosulfursilanes of formula (II) are, for example, bis (3-alkoxysilylalkyl) polysulfides having from 2 to about 6, with an average of 2 to 2.6 or from 3.5 to 4 connecting sulfur atoms in its polysulfidic bridge. For example, such materials might be selected from at least one of a bis-(3-triethoxysilylpropyl) disulfide material with an average of from 2 to 2.6 connecting sulfur atoms in its polysulfidic bridge, and a bis(3-triethoxysilylpropyl) tetrasulfide material with an average of from 3.5 to 4 connecting sulfur atoms in its polysulfidic bridge.

In one aspect of the invention, as hereinbefore discussed, the precipitated silica may be treated with both an alkylsilane, as a hydrophobating agent, represented by formula (III) optionally with a coupling agent represented by formula (II) and alternatively with the organomercaptosilane of formula (IV) whether by itself or in combination with said alkylsilane and/or coupling agent.

In practice of the invention, various diene-based elastomers (in addition to said functionalized diene-based elastomer) may be used for tire tread rubber composition.

Such diene based elastomers may be, for example, homopolymers and copolymers of conjugated dienes such as for example isoprene and 1,3-butadiene and copolymers of such dienes with a vinyl aromatic compound such as styrene or alphamethyl styrene, preferably styrene.

Representative of such additional elastomers are, for example, cis 1,4-polyisoprene rubber (natural and synthetic), cis 1,4-polybutadiene rubber, styrene/butadiene copolymer rubber (prepared by aqueous emulsion of organic solvent polymerization), styrene/isoprene/butadiene terpolymer rubber, butadiene/acrylonitrile rubber, 3,4-polyisoprene rubber and isoprene/butadiene copolymer rubber.

In practice, the rubber composition may contain a tin and/or silicon coupled, preferably tin coupled, diene-based elastomer prepared by organic solvent polymerization in the presence of a suitable tin-based catalyst complex of at least one of isoprene and 1,3-butadiene monomers or of styrene together with at least one of isoprene and 1,3-butadiene monomers. Said tin and/or silicon coupled elastomers may be selected from, for example, styrene/butadiene copolymers, isoprene/butadiene copolymers, styrene/isoprene copolymers and styrene/isoprene/butadiene terpolymers. The preparation of tin and silicon coupled elastomers via organic solvent polymerization is well known to those having skill in such art.

In practice, the rubber composition may contain a functionalized diene-based elastomer. For example, a functionalized elastomer may be provided as a diene-based elastomer as described above which contains one or more functional groups such as, for example, one or more hydroxyl groups, carboxyl groups, silanol groups, amine groups and epoxy groups, which are available to participate in reactions with, for example rubber reinforcing fillers such as, for example, carbon black (actually moieties such as for example minor amounts of carboxyl groups on the surface of carbon black), carbon black which contains domains of silica on its surface, amorphous silica, clay (particularly water swellable clay such as for example montmorillonite clay), and starch-based reinforcement. Such functionalized diene-based elastomers, and their preparation, are well known to those having skill in such art.

In practice, a starch/plasticizer composite for use in this invention is a composite of starch and plasticizer therefore. Such starch may be comprised of amylose units and amylopectin units in a ratio of, for example, about 10/90 to about 35/65, alternatively about 20/80 to about 30/70, and has a softening point according to ASTM No. D1228 in a range of about 180° C. to about 220° C.; and the starch/plasticizer composite itself having a softening point in a range of about 110° C. to about 170° C. according to ASTM No. D1228.

In practice, the starch/plasticizer composite may be desired to be used, for example, as a free flowing, dry powder or in a free flowing, dry pelletized form. In practice, it is desired that the synthetic plasticizer itself is compatible with the starch, and has a softening point lower than the softening point of the starch so that it causes the softening of the blend of the plasticizer and the starch to be lower than that of the starch alone.

For the purposes of this invention, the plasticizer effect for the starch/plasticizer composite, (meaning a softening point of the composite being lower than the softening point of the starch), can be obtained through use of a polymeric plasticizer such as, for example, poly(ethylenevinyl alcohol) with a softening point of less than 160° C. Other plasticizers, and their mixtures, are contemplated for use in this invention, provided that they have softening points of less than the softening point of the starch, and preferably less than 160° C., which might be, for example, one or more copolymers and hydrolyzed copolymers thereof selected from ethylene-vinyl acetate copolymers having a vinyl acetate molar content of from about 5 to about 90, alternatively about 20 to about 70, percent, ethylene-glycidal acrylate copolymers and ethylene-maleic anhydride copolymers. As hereinbefore stated hydrolysed forms of copolymers are also contemplated. For example, the corresponding ethylene-vinyl alcohol copolymers, and ethylene-acetate vinyl alcohol terpolymers may be contemplated so long as they have a softening point lower than that of the starch and preferably lower than 160° C.

In general, the blending of the starch and plasticizer involves what are considered or believed herein to be relatively strong chemical and/or physical interactions between the starch and the plasticizer.

In general, the starch/plasticizer composite has a desired starch to plasticizer weight ratio in a range of about 0.5/1 to about 4/1, alternatively about 1/1 to about 2/1, so long as the starch/plasticizer composition has the required softening point range, and preferably, is capable of being a free flowing, dry powder or extruded pellets, before it is mixed with the elastomer(s).

The synthetic plasticizer(s) may be of a viscous nature at room temperature, or at about 23° C. and, thus, considered to be a liquid for the purposes of this description, although the plasticizer may actually be in a form of a viscous liquid at room temperature since it is to be appreciated that many plasticizers are polymeric in nature.

Representative examples of synthetic plasticizers are, for example, poly(ethylenevinyl alcohol), cellulose acetate and diesters of dibasic organic acids, so long as they have a softening point sufficiently below the softening point of the starch with which they are being combined so that the starch/plasticizer composite has the required softening point range.

Preferably, the synthetic plasticizer is selected from at least one of poly(ethylenevinyl alcohol) and cellulose acetate.

For example, the aforesaid poly(ethylenevinyl alcohol) might be prepared by polymerizing vinyl acetate to form a poly(vinylacetate) which is then hydrolyzed (acid or base catalyzed) to form the poly(ethylenevinyl alcohol). Such reaction of vinyl acetate and hydrolyzing of the resulting product is well known those skilled in such art.

For example, vinylalcohol/ethylene (60/40 mole ratio) copolymers can be obtained in powder forms at different molecular weights and crystallinities such as, for example, a molecular weight of about 11700 with an average particle size of about 11.5 microns or a molecular weight (weight average) of about 60,000 with an average particle diameter of less than 50 microns.

Various blends of starch and ethylenevinyl alcohol copolymers can then be prepared according to mixing procedures well known to those having skill in such art. For example, a procedure might be utilized according to a recitation in the patent publication by Bastioli, Bellotti and Del Trediu entitled *A Polymer Composition Including Destructured Starch An Ethylene Copolymer*, U.S. Pat. No. 5,403,374.

Other plasticizers might be prepared, for example and so long as they have the appropriate Tg and starch compatibility requirements, by reacting one or more appropriate organic dibasic acids with aliphatic or aromatic diol(s) in a reaction which might sometimes be referred to as an esterification condensation reaction. Such esterification reactions are well known to those skilled in such art.

It is readily understood by those having skill in the art that the rubber composition of the tire component for this invention would be compounded by methods generally known in the rubber compounding art, such as mixing the various sulfur-vulcanizable constituent rubbers with various commonly used additive materials such as, for example, curing aids, such as sulfur, activators, retarders and accelerators, processing additives, such as oils, resins including tackifying resins, silicas, and plasticizers, fillers, pigments, fatty acid, zinc oxide, waxes, antioxidants and antiozonants, peptizing agents and reinforcing materials such as, for example, carbon black. As known to those skilled in the art, depending on the intended use of the sulfur vulcanizable and sulfur vulcanized material (rubbers), the additives mentioned above are selected and commonly used in conventional amounts.

The presence and relative amounts of the above additives are not considered to be an aspect of the present invention which is more primarily directed to the utilization of the aforesaid functionalized elastomer and specialized aggregates of precipitated silica for a tire tread rubber composition.

The tires can be built, shaped, molded and cured by various methods which will be readily apparent to those having skill in such art.

The invention may be better understood by reference to the following example in which the parts and percentages are by weight unless otherwise indicated.

EXAMPLE I

Mixtures of diene rubber compositions were prepared comprised of recipes shown in Table 1 as Samples A, B, C and D, with Sample A being a Control Sample.

Control Sample A utilized a blend of styrene/butadiene rubber (SBR), cis 1,4-polyisoprene natural rubber and 3,4-polyisoprene rubber together with carbon black and classical silica as HiSil 210 from PPG Industries company together with an organosilane tetrasulfide coupling agent.

Samples B and Sample C utilized a blend of cis 1,4-polyisoprene rubber, cis 1,4-polybutadiene rubber, tin coupled isoprene/butadiene rubber and high vinyl polybutadiene rubber together with silica "A" or silica "B", respectively as the reinforcing filler and with an organosilane disulfide coupling agent instead of an organosilane tetrasulfide coupling agent.

Sample D utilized a blend of cis 1,4-polybutadiene rubber, tin coupled isoprene/butadiene rubber and functionalized (an SiOR moiety) modified styrene/butadiene rubber together with silica "B" and an organosilane disulfide coupling agent.

Silica "A" was Zeopol 8745™ and silica "B" was Zeopol 8715™ silica from the J. M. Huber Corporation.

Conventional, preferred, amounts of antidegradant(s) (para-phenylene diamine type), tackifying resin, fatty acid, zinc oxide, rubber processing oil, and peptizer, were used. The rubber blends are exemplified in the following Table 1.

TABLE 1

| Material | Control Sample A | Sample B | Sample C | Sample D |
|---|---|---|---|---|
| First Non-Productive Mix Stage (about 165° C.) | | | | |
| Styrene/butadiene rubber[1] | 30 | 0 | 0 | 0 |
| Natural rubber[2] | 55 | 20 | 20 | 20 |
| Cis 1,4-polybutadiene rubber[3] | 0 | 12 | 12 | 12 |
| High vinyl polybutadiene rubber[4] | 0 | 38 | 38 | 0 |
| 3,4-Polyisoprene rubber[5] | 15 | 0 | 0 | 0 |
| Functionalized rubber[6] | 0 | 0 | 0 | 38 |
| Tin coupled IBR[7] | 0 | 30 | 30 | 30 |
| Processing (paraffinic) oil | 6 | 9 | 9 | 0 |
| Carbon black[8] | 38 | 0 | 0 | 0 |
| Zeopol 8745 silica[9] | 0 | 50 | 0 | 0 |
| Zeopol 8715 silica[10] | 0 | 0 | 50 | 50 |
| Coupling agent[11] | 0 | 7.05 | 4.94 | 4.94 |
| Coupling agent/silica ratio (percent) | — | 14% | 10% | 10% |
| Second Non-Productive Mix Stage (about 150° C. for Sample A and about 165° C. for Samples B and C) Materials added in said Second Non-Productive Mix Stage | | | | |
| HiSil 210 Silica[12] | 10 | 0 | 0 | 0 |
| Coupling agent[13] | 2 | 0 | 0 | 0 |
| Coupling agent/silica ratio (percent) | 20% | — | — | — |
| Productive Mix Stage (about 110° C.) | | | | |
| Sulfur | 1.7 | 2.0 | 2.0 | 2.0 |
| Accelerators[14] | 1.3 | 1.6 | 1.6 | 1.6 |

[1] A solution polymerization prepared styrene/butadiene copolymer elastomer having a styrene content of about 12 percent and a Tg of about −42° C. obtained from The Goodyear Tire & Rubber Company as Solflex ™ 1216.
[2] Cis 1,4-polyisoprene natural rubber
[3] cis 1,4-polybutadiene rubber obtained as Budene ™ 1207 from The Goodyear Tire & Rubber Company
[4] High vinyl polybutadiene having a vinyl 1,2-content of about 80 percent obtained from The Goodyear Tire & Rubber Company
[5] 3,4-polyisoprene having a Tg of about −16° C. from The Goodyear Tire & Rubber Company
[6] Functionalized solution polymerization prepared styrene/butadiene elastomer having a bound styrene of about 26 percent based on the elastomer, a vinyl 1,2-content of about 67 percent based on the butadiene component of the elastomer, and Tg of about −26° C. and a Mooney (1 + 4) viscosity at 100° C. of about 37, functionalized by containing internal silanol units, as T0595 from the JSR (Japan Synthetic Rubber) Corporation, oil extended with 37.5 parts by weight of oil per 100 parts of the elastomer (14.5 parts by weight oil for the 38.5 parts elastomer) and reported in the Table as a dry weight (38 phr) of the elastomer.
[7] Tin coupled isoprene/butadiene copolymer elastomer with an isoprene content of about 30 percent from The Goodyear Tire & Rubber Company
[8] An N299 (ASTM designation) carbon black having a reported Iodine number of about 108 g/kg with a DBP value of about 124 cc/100 g
[9] Silica as Zeopol 8745 from J. M. Huber Corporation, reportedly having an average total of about 13 hydroxyl groups per square nanometer of silica surface area and a ratio of geminal hydroxyl groups to said average total of about 0.23/1; a CTAB value of about 145 $m^2/g$ and a BET value of about 185 $m^2/g$.
[10] Silica as Zeopol 8715 from J. M. Huber Corporation reportedly characterized by having an average total of about 18 hydroxyl groups per square nanometer surface of said silica and a ratio of geminal hydroxyl groups to said average total of about 0.27/1, a CTAB value of about 94 $m^2/g$ and a BET value of about 163 $m^2/g$.
[11] Coupling agent as X266S ™ as a bis (3-triethoxysilylpropyl) polysulfide containing from about 2 to about 2.6 sulfur atoms in its polysulfidic bridge, and referred to in this Example as a disulfide, on carbon carrier in a 50/50 weight ratio from Degussa-Huls and reported in Table 1 as the disulfide.
[12] Silica as classical HiSil 210 ™ from PPG Industries
[13] Coupling agent as X50S ™ as a bis(3-triethoxysilylpropyl) polysulfide containing from about 3.5 to about 4 sulfur atoms in its polysulfidic bridge, and referred to in this Example as a tetrasulfide, on carbon carrier in a 50/50 weight ratio from Degussa-Huls company and reported in Table 1 as the tetrasulfide
[14] Accelerators as, variously, a sulfenamide together with diphenyl guanidine or tetramethyl thiuram disulfide.

Significantly, it can be seen in Table 1 that the coupling agent used was about 20 weight of the silica for the Control Sample A, about 14 percent for Sample B and only about 10 percent for Sample C and Sample D. This is considered herein to be significant because it indicates that the amount of coupling agent can be reduced, with an accompanying reduction of reaction alkoxy moiety of the coupler with the hydroxyl groups of the precipitated silica to thereby both reduce ethanol byproduct formation during the mixing with the rubber composition as well as improve the efficiency/productivity of the interaction between the said alkoxy moiety and said hydroxyl groups and as well as reducing the cost of use of the coupling agent.

EXAMPLE II

The prepared rubber Samples of Example I were cured at a temperature of about 160° C. for about 14 minutes and the various physical properties (rounded numbers are reported herein) as reported in the following Table 2.

TABLE 2

| Properties | Control | | | |
|---|---|---|---|---|
| | Sample A | Sample B | Sample C | Sample D |
| Stress/strain | | | | |
| 100% modulus (MPa) | 1.9 | 1.8 | 1.9 | 1.7 |
| 300% modulus (MPa) | 10.2 | 9.9 | 10.6 | 9.9 |
| Hardness | | | | |
| 23° C. | 63 | 63.3 | 60.1 | 58 |
| 100° C. | 57.4 | 59 | 57.3 | 55.7 |
| Rebound | | | | |
| 23° C. | 46.8 | 57.6 | 63.3 | 61.1 |
| 100° C. | 66.1 | 72.5 | 76.8 | 77.9 |
| DIN abrasion, rel. volume loss (cc) | 146 | 95 | 114 | 113 |
| Tan Delta | | | | |
| 0° C. | 0.21 | 0.15 | 0.15 | 0.2 |
| 60° C. | 0.085 | 0.065 | 0.052 | 0.05 |

From Table 2 it is seen that Sample D, which contains the silanol functionalized styrene/butadiene copolymer rubber and the Silica (B), provides a 41 percent decrease in Tan Delta at 60° C. and a 23 percent improvement in abrasion resistance (less volume loss is better), as compared to the Control Sample A which contained conventional elastomers, classical silica and classical coupling agent. The decrease of Tan Delta at 60° C. and improvement in resistance to abrasion, are indicative of improved rolling resistance and reduced tread wear, respectively, for a tire having a tread of such composition.

From Table 2 it is also seen that Sample D, exhibits a similar Tan Delta at 0° C. as the Control Sample A, which is indicative of satisfactory wet traction for a tire having a tread of such rubber composition.

Samples B and C, which did not contain the silanol functionalized styrene/butadiene elastomer, exhibited a lower Tan Delta at 0° C., as compared to Sample A, which is indicative of reduced wet traction property for a tire with a tread of such rubber composition.

As pointed out in a footnote to Example I, the coupling agent used for the Control Sample A amounted to about 20 weight of the silica. However, for Sample B only about 14 percent was used and for Samples C and D only about 10 percent was used. As seen in Table 2, suitable physical properties, particularly modulus, rebound (hysteresis) and abrasion resistance values were obtained with the reduced amount of coupling agent for Samples C and D. This is considered herein to be significant because it is seen that Sample D (which employed the functional styrene/butadiene elastomer) illustrates a most efficient use of the coupling agent, which improves productivity of the rubber composition, reduces alcohol byproduct formation and lowers the cost of the coupling agent itself.

While certain representative embodiments and details have been shown for the purpose of illustrating the invention, it will be apparent to those skilled in this art that various changes and modifications may be made therein without departing from the spirit or scope of the invention.

What is claimed is:

1. A tire having at least one component of a rubber composition comprised of, based upon 100 parts by weight of elastomer (phr),
   (A) 100 phr of elastomers comprised of:
      (1) about 30 to about 80 phr of a styrene/butadiene elastomer composite (SBR Composite) comprised of a styrene/butadiene copolymer elastomer (SBR-1) and a functionalized styrene/butadiene copolymer elastomer (SBR-2) which contains at least internal silicon atom, with associated pendent hydroxyl and/or alkoxy groups, as a part of the (SBR-2) elastomer chain to thereby divide said elastomer into at least two segments thereof (SBR-2A and SBR-2B) with the silicon atom of said silanol and/or siloxy group therebetween, wherein said SBR composite is thereby comprised of a polymodal molecular weight configuration comprised about 35 to about 55 weight percent thereof of said (SBR-1) having a number average molecular weight (Mn) in a range of about 200,000 to about 300,000 and, correspondingly, about 65 to about 35 weight percent thereof of said (SBR-2) having a number average molecular weight (Mn) in a range of about 400,000 to 550,000; wherein said elastomer contains from zero to a maximum of ten weight percent of an additional styrene/butadiene elastomer (SBR-3) pendent from said silicon atom having a number average molecular weight (Mn) of greater than 550,000 and styrene content and Tg values within the ranges of said SBR-1 and SBR-2; and
      (2) about 20 to about 70 phr of at least one additional diene-based elastomer; and
   (B) about 35 to about 100 phr of particulate reinforcement comprised of:
      (1) about 35 to about 85 phr of aggregates of precipitated silica comprised of a plurality of individual elementary silica particles, wherein said silica particles contain hydroxyl groups thereon and characterized in that a portion of said silica particles contain geminal hydroxyl in a ratio of geminal hydroxyl groups to hydroxyl groups of at least 0.2/1,
      (2) from zero to about 15, phr of carbon black,
   (C) a coupling agent having:
      (1) a moiety reactive with
         (a) said hydroxyl groups contained on the surface of said silica and carbon black; and
         (b) said silanol and/or siloxy groups of said (SBR-2) elastomer, and;
      (2) another moiety interactive with said additional diene-based elastomer and said SBR composite, and:
   (D) optionally, about 1 to about 10 phr of a starch/plasticizer composite comprised of starch and plasticizer therefor of a weight ratio in a range of about 0.5/1 to about 5/1, wherein said starch/plasticizer composite has a softening point in a range of from about 110° C. to about 170° C.,
   wherein said (SBR-2) is comprised of at least one functionalized styrene/butadiene elastomer of the general Formula (I) the general Formula (I-A) and the general Formula (I-B):

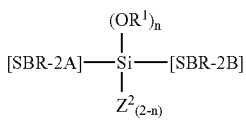

(I)

wherein said [SBR-2A] and [SBR-2B] are individual segments each having a bound styrene content in a range of from about 25 to about 35 percent, a vinyl 1,2-content in a range of about 50 to about 70 percent based on the butadiene component of the respective styrene/butadiene (SBR-2) copolymer, a Tg in a range of about −15° C. to about −30° C.; wherein the silicon (Si) atom is attached to a butadiene moiety of the respective (SBR-2A) and (SBR-2B); $R^1$ is selected from selected from hydrogen, methyl, ethyl, propyl, butyl and phenyl groups; and $Z^2$ is selected from an additional SBR segment of said styrene content and said Tg, an alkyl radical containing from 1 to about 18 carbon atoms, or an aromatic radical containing from 6 to about 12 carbon atoms, and where n is a value of from 1 to 2, and

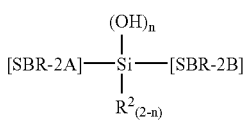

(IA)

wherein $R^2$ is a radical selected from isopropyl, t-butyl, phenyl and tolyl radicals and n is a value ranging from zero to 2, and

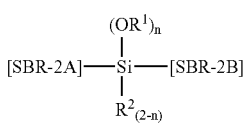

(IB)

wherein $R^1$ is selected from methyl, ethyl, propyl, butyl, and phenyl radicals, and $R^2$ is a radical selected from isopropyl, t-butyl, phenyl and tolyl radicals and n is a value in a range of from zero to 2.

2. The tire of claim 1 wherein said precipitated silica aggregates have:
(A) a CTAB value according to ASTM D3765 test in a range of from about 80 to about 100, alternately about 80 to about 89, m2/g, and
(B) a BET according to ISO 57/94/1, Annex D test in a range of about 155 to about 170 m2/g.

3. The tire of claim 1 wherein $R^1$ is selected from hydrogen or an ethyl group and n is 2.

4. The tire of claim 1 wherein n is 2 for said styrene/butadiene of general Formula (I-A).

5. The tire according to claim 1 wherein $R^1$ is an ethyl group and n is 2 for said styrene/butadiene of general Formula (I-B).

6. The tire of claim 1 wherein said silica has an average total hydroxyl content in a range of from about 15 to about 20, hydroxyl groups per square nanometer of surface area of said silica particles.

7. The tire of claim 1 wherein said coupling agent is an organosulfur silane of the general formula (II):

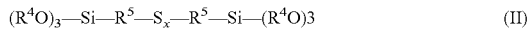

(II)

wherein $R^4$ is an alkyl radical selected from at least one of methyl and ethyl radicals, R5 is an alkylene radical having from 1 to 18 carbon atoms, x is a value in a range of 2 to 8, with an average of from 2 to about 2.6 or from about 3.5 to about 4.

8. The tire of claim 1 wherein said precipitated silica is, prior to blending with said elastomer(s):
(A) pre-treated with an with an alkylsilane of the general Formula (III) prior to blending with said elastomer(s) and said coupling agent;
(B) pre-treated with said coupling agent of formula (II); pre-treated with an organomercaptosilane of formula (IV), or
(C) pre-treated with a combination of said alkylsilane of Formula (III) with and
(1) said coupling agent of the general Formula (II) and/or
(2) said organomercaptosilane of Formula (IV),
wherein said alkylsilane of the general Formula (III) is represented as:

(III)

wherein $R^6$ is an alkyl radical having from 1 to 18 carbon atoms, n is a value of from 1 through 3; X is selected from chlorine, methoxy and ethoxy radicals, and wherein said organomercaptosilane of the general Formula (IV) is represented as:

(IV)

wherein X is a radical selected from chlorine, bromine and from alkyl radicals having from one to 16 carbon atoms; wherein $R^7$ is an alkyl radical having from one through 4 carbon atoms; wherein $R^8$ is an alkylene radical having from one to 16 carbon atoms; and n is an average value of from zero through 3.

9. The tire of claim 8 wherein said tire is comprised of a component of a rubber composition exclusive of any appreciable content of in situ formed alcohol.

10. The tire of claim 8 wherein, for said Formula (IV), X is chlorine and R7 is selected from methyl and ethyl radicals and n is an average value of about 3.

11. The tire of claim 8 wherein $R^7$ is an ethylene radical, $R^8$ is a propylene radical and n is zero.

12. The tire of claim 8 wherein said alkylsilanes of formula (III) are selected from at least one of the group consisting of trichloromethylsilane, dichlorodimethylsilane, chlorotrimethylsilane, trimethoxymethylsilane, dimethoxydimethylsilane, methoxytrimethylsilane, trimethoxypropylsilane, trimethoxyoctylsilane, trimethoxyhexadecylsilane, dimethoxydipropylsilane, triethoxymethylsilane and diethoxydimethylsilane.

13. The tire of claim 8 wherein said organomercaptosilanes of formula (IV) are selected from at least one of the group consisting of mercaptomethyltrimethoxysilane, mercaptoethyltrimethoxysilane, mercaptopropyltrimethoxysilane, mercaptomethyltriethoxysilane, mercaptoethyltripropoxysilane, mercaptopropyltriethoxysilane and mercaptopropyltrimethoxysilane.

14. The tire of claim 1 wherein said rubber composition contains from about 1 to about 10 phr of a starch/plasticizer composite comprised of starch and plasticizer therefor of a weight ratio in a range of about 0.5/1 to about 5/1, wherein said starch/plasticizer composite has a softening point in a range of from about 110° C. to about 170° C.

15. The tire of claim 13 wherein starch/plasticizer composite is a composite of starch and synthetic plasticizer comprised of at least one of poly(ethylenevinyl alcohol) and cellulose acetate.

16. The tire of claim 1 wherein said coupling agent is a combination of a bis-(3-triethoxysilylpropyl) polysulfide having an average of from 2 to 2.5 connecting sulfur atoms in its polysulfidic bridge and a bis-(3-triethoxysilylpropyl) polysulfide having an average of from 3 to 4 connecting sulfur atoms in its polysulfidic bridge, wherein said polysulfide having an average of from 2 to 2.5 connecting sulfur atoms in its polysulfidic bridge is blended with said rubber composition in the absence of sulfur and sulfur vulcanization accelerator and wherein said polysulfide having an average of from 3 to 4 connecting sulfur atoms in its polysulfidic bridge is thereafter blended with said rubber composition in the presence of sulfur and at least one sulfur vulcanization accelerator.

17. The tire of claim 1 wherein said component is a tire tread.

* * * * *